Feb. 22, 1944  J. YOUHOUSE  2,342,319
PORTABLE MOTOR DRIVEN DEVICE
Original Filed July 30, 1938
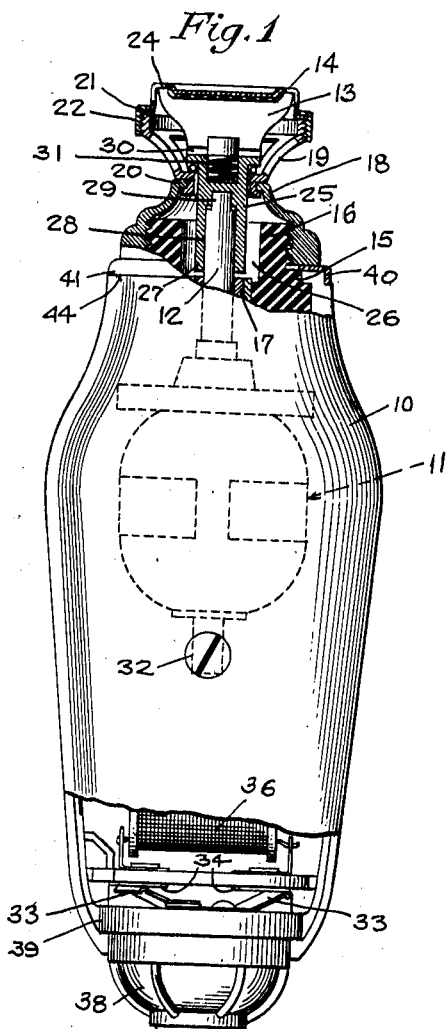
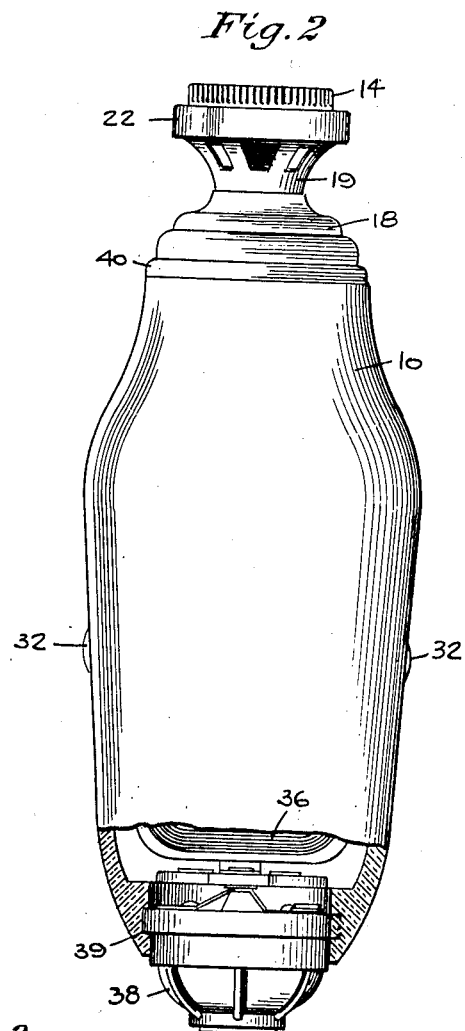
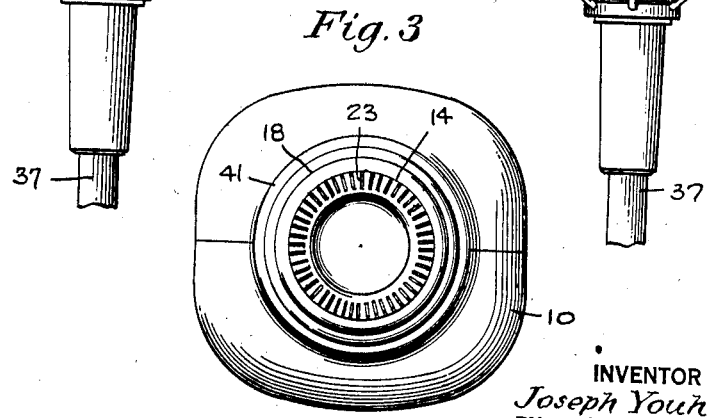
INVENTOR
Joseph Youhouse
BY
ATTORNEYS Patented Feb. 22, 1944

2,342,319

UNITED STATES PATENT OFFICE 2,342,319

PORTABLE MOTOR DRIVEN DEVICE

Joseph Youhouse, Fairfield, Conn., assignor to Casco Products Corporation, Bridgeport, Conn., a corporation of Connecticut Original application July 30, 1938, Serial No. 222,123, now Patent No. 2,264,033, dated November 25, 1941. Divided and this application July 9, 1941, Serial No. 401,581

6 Claims. (Cl. 172—36)

This application is a division of application, Serial No. 222,123, filed July 30, 1938, now Patent Number 2,264,033, issued November 25, 1941, and relates to power tools, and, more particularly, to a portable motor driven device.

An object of the present invention is to provide a portable motor driven device which can be comfortably held in the hand and readily manipulated by the user. To this end, the device of the present invention is provided with a casing which houses the motor of the device and forms a handle for the same, being so shaped that it comfortably fits within, and can be easily and readily grasped by the hand of the user.

In the now preferred form of the invention, the casing is substantially oval having a relatively pointed end through which projects a tool carrying member driven by the motor, the opposite end of the casing being of generally spherical shape and carrying an actuator for a switch enclosed within the casing.

The switch actuator in the now preferred form of the invention comprises a button having a convex shape to conform with the generally spherical end of the casing. The outer surface of the button is substantially flush with the adjacent portion of the casing and presents no raised surfaces such as might interfere with the handling of the device.

In the illustrated embodiment of this invention, the casing is formed of a plurality of sections of moldable material suitably fastened together and reinforced by a ring which is disposed around the exterior of the casing and locked in place. The switch is held in operative position between the two halves of the casing.

Other features and advantages will hereinafter appear.

In the accompanying drawing:

Figure 1 is a front elevational view having a part of the casing broken away to show partly in section and partly in elevation the cutting tool and the switch which controls the operation of the motor.

Fig. 2 is a side elevational view with a portion of the casing broken away.

Fig. 3 is a top plan view of the device.

The device of the present invention comprises a casing 10 housing a motor 11 and means for mounting the same. The armature shaft 12 of the motor projects from one end of the casing and forms a tool driving member, the tool herein being shown as a cutter blade 13 cooperating with a perforated cutter head 14 for severing hair from the face of the user.

The motor 11 and the means for mounting the same is disclosed and claimed in my copending application above identified and will not be specifically described herein.

The motor mounting means comprises a subframe 15 which supports the motor and has an integral collar 16 carrying a bearing assembly 17 for supporting one end of the armature shaft 12 of the motor.

Since the subframe carries the motor, it will take the strain incident to the operation thereof and the casing can be made of "Tenite" or other suitable material which can be readily molded.

The subframe, not only carries the motor, but is also adapted to have the tool mounted thereon. The tool of the present invention, referring now to Fig. 1, comprises a substantially truncate collar 18 adapted to be threaded to the collar 16 of the subframe and has an outwardly flared casing 19 secured to a reduced neck portion 20 of the collar 18 so as to extend outwardly thereof and forms a hollow casing surrounding the end of the armature shaft. The outer face of the hollow casing supports an outwardly projecting flange 21 carried by the cutter head 14 which is locked to the casing by a flanged ring 22.

The cutter head is provided with a plurality of hair-receiving apertures 23 herein shown as radial slots extending through the face and side wall of the cutter head. Within the cutter head is mounted the cutter blade 13 having a plurality of cutting surfaces 24 which cooperate with the slots in the cutter head to sever hairs extending therethrough upon relative rotation of the blade with respect to the head.

The cutter blade is coupled to the drive shaft for rotation therewith, and, in the preferred form of the invention, the blade is coupled to the drive shaft through a sleeve 25 adapted to fit over the projecting end of the armature shaft and extend into a recess 26 formed in the collar 16. The end face 27 of the sleeve is provided with a socket 28 to receive the end of the drive shaft. The end of the drive shaft is slabbed as at 29 and the inner wall of the socket is correspondingly shaped so as to provide a positive driving connection between the shaft and the sleeve.

Upon rotation of the armature shaft, the cutter blade which is mounted in an open transverse slot 30 formed in the upper end of the sleeve 25, will be driven through the engagement of the walls of the slot with the blade.

The cutter blade is yieldingly urged into engagement with the undersurface of the cutter head by a spring 31.

The casing 10, which houses the motor and the subframe upon which the motor is mounted, as it is to form a handle by which the device may be grasped in use, preferably is given a shape so that it may be comfortably held in the hand of the user.

In the now preferred form of the invention, the casing is made up of two sections, each being substantially semioval in cross section and forming, when secured together, a generally oval casing having a pointed end adjacent the tool, the opposite end being of generally spherical shape and carrying an actuator for a switch enclosed within the casing. The sections of the casing are secured together by suitable screws 32.

The switch preferably is of the type described in the copending application, Serial No. 208,512, filed May 18, 1938, and comprises a pair of contacts 33 which are movable into engagement with a pair of contacts 34 carried by a fixed contact plate 35.

One of the fixed contacts is connected to the field coil 36 which is connected to one of the brushes of the motor by a conductor, not shown, while the other fixed contact is connected to a suitable conductor to the other brush of the motor. The movable contacts 33 are each connected to one conductor of a twin conductor cord 37.

The switch enclosed by the casing is held in proper relation thereto by sections of the casing, for the switch actuator 38 is provided with a peripheral flange which is rotatably mounted in grooves 39 formed on the interior side of each section of the casing.

The switch actuator 38, in the now preferred form of the invention, comprises a button having a convex shape to conform with the generally spherical end of the casing. The outer surface of the button is substantially flush with the adjacent portion of the casing and presents no raised surfaces such as might interfere with the handling of the device.

To prevent the sections of the casing from separating, a ring 40 is disposed about the exterior surface thereof adjacent the collar 18. Preferably, this ring has a flange 41 disposed about an annular seat 44 and is clamped in place by the collar 18 when the latter is threaded onto the end of the collar 16 of the surframe.

Variations and modifications may be made within the scope of this invention and portions of the improvements may be used without others.

I claim:

1. A power tool comprising a housing adapted to be held in the hand, a motor in said housing, a tool carrying member projecting from the housing adapted to be actuated by the motor, said housing being of generally oval form, a switch in said housing, a rotatable actuating member for said switch located at the rear end of said housing and substantially flush with, and conforming in shape to said end and a lead-in conductor entering said housing through an aperture centrally formed in said actuating member, said lead-in conductor secured to and rotatable with said actuating member about an axis coincident with the longitudinal axis of said tool.

2. A power tool comprising a housing adapted to be held in the hand, said housing being of generally oval form having a pointed forward end and a substantially semi-spherical rear end, a motor within said housing, tool carrying means mounted on the rotor and extending out of said housing at the pointed end, a switch within said housing, an actuating member for said switch comprising a rotary button mounted in the substantially semi-spherical end of the housing so as to be flush with the surface thereof, said button being of convex form and substantially conforming in shape to the rear end of said housing, and a lead-in conductor extending thru an aperture centrally formed in said button, said conductor secured to said button and rotatable therewith about an axis coincident with the longitudinal axis of said tool.

3. A power tool comprising a pair of longitudinally separable sections forming when secured together a housing of generally oval form, a motor in said housing, a tool carrying member projecting from the front end of said housing, a switch in said housing, an actuating member for said switch located at the rear end of said housing and substantially flush with, and conforming in shape to said end of the housing, said actuating member being rotatable about the longitudinal axis of said tool and having a centrally formed aperture therein, a conductor extending thru said aperture and connected to said switch and means for securing said sections together, the secured together sections holding said switch and actuator against accidental movement.

4. A power tool comprising a pair of longitudinally separable sections forming when secured together a housing of generally oval form, a motor in said housing, a tool carrying member projecting from the housing, a switch in said housing, an actuating member for said switch located at the rear end of said housing and substantially flush with, and conforming in shape to said end of the housing, said actuating member being rotatable about the longitudinal axis of said tool and having a centrally formed aperture therein, a conductor secured to said switch and coaxially projecting rearwardly through said aperture and rotatable with said actuating member and means for securing said sections together, the secured together sections holding said switch and actuator against accidental movement, the tool carrying member including means for locking said securing means to said housing.

5. A power tool comprising a pair of longitudinally separable sections forming, when secured together, a housing of generally oval form adapted to be held in the hand, and having a pointed forward end and a substantially semi-spherical rear end, means for securing said sections together, a motor within said housing, tool carrying means mounted on the rotor and extending out of said housing at the pointed end, a switch within said housing, and an actuating member for said switch comprising a rotary button mounted in the substantially spherical end of the housing so as to be flush with and substantially conforming in shape to said end, said button being rotatable about the longitudinal axis of said tool and having a centrally formed opening therein, a conductor coaxially extending through said opening and fixed to rotate with said button, the secured together sections of said housing holding said switch and actuating member against accidental movement, the tool carrying means including means for locking said securing means to said housing.

6. A power tool comprising a housing adapted to be held in the hand; a motor in said housing; a tool-carrying member projecting from the housing adapted to be actuated by the motor; a switch in said housing; a rotatable actuating member for the switch located at the rear end of said housing, said housing having an inwardly curved end and the actuating member having an exterior surface which is a continuation of the curvature of the housing to provide a rounded end for the housing, the actuating member having a central aperture; and a lead-in conductor for connecting the motor to a source of power entering said housing through the aperture, said actuating member being rotatable about an axis coincident with the longitudinal axis of the tool.

JOSEPH YOUHOUSE.